United States Patent
Reckevícius et al.

(10) Patent No.: US 9,737,967 B2
(45) Date of Patent: Aug. 22, 2017

(54) UNIVERSAL MAGNETIC TABLE JIG ASSEMBLIES AND METHODS FOR POSITIONING A WORKPIECE, ESPECIALLY FOR THE FABRICATION OF AIRCRAFT STRUCTURAL COMPONENTS

(71) Applicant: EMBRAER S.A., São José dos Campos-SP (BR)

(72) Inventors: André Cordeiro Reckevícius, São José dos Campos (BR); André Luiz Oliveira Amaral Palmeira, São José dos Campos (BR); Paulo Reiss, Jr., São José dos Campos (BR); João Marcos Gomes de Mello, São José dos Campos (BR); Wagner Caraça, São José dos Campos (BR)

(73) Assignee: EMBRAER S.A., São José dos Campos-SP (BR)

( * ) Notice: Subject to any disclaimer, the term of this patent is extended or adjusted under 35 U.S.C. 154(b) by 120 days.

(21) Appl. No.: 14/573,197

(22) Filed: Dec. 17, 2014

(65) Prior Publication Data
US 2016/0176003 A1 Jun. 23, 2016

(51) Int. Cl.
*B23Q 3/15* (2006.01)
*B23Q 3/154* (2006.01)
(Continued)

(52) U.S. Cl.
CPC ......... *B23Q 3/1546* (2013.01); *B23Q 3/1543* (2013.01); *B23Q 3/186* (2013.01);
(Continued)

(58) Field of Classification Search
CPC ....... B23Q 3/186; B25B 11/002; B25B 11/02; B25H 1/04; B25H 1/08; B64F 5/0009
See application file for complete search history.

(56) References Cited

U.S. PATENT DOCUMENTS 1,343,648 A * 6/1920 Smith .................... B21D 43/18
198/619
2,421,716 A * 6/1947 Rose .................. B23K 37/0435
219/158

(Continued)

FOREIGN PATENT DOCUMENTS

WO        WO 00/30804          6/2000

*Primary Examiner* — Joseph J Hail
*Assistant Examiner* — Tyrone V Hall, Jr.
(74) *Attorney, Agent, or Firm* — Nixon & Vanderhye P.C.

(57) ABSTRACT

Magnetic table jig assemblies and methods allow workpieces (e.g., aircraft components to be fabricated) on a table top of the table jig assembly to be accurately indexed relative to a robotically operated tool (e.g., a robotically operated drill). The magnetic table jig assembly may include a wheeled frame which is capable of rolling movement across a floor surface, a horizontally planar table top exhibiting ferromagnetic properties supported by the frame and a plurality of magnetic workpiece positioners each including an actuator to magnetically couple and decouple the magnetic workpiece positioner to the table top. The workpiece will therefore be positioning restrained on the table top by magnetically coupling the plurality of the magnetic workpiece positioners to the table top in abutting relationship to a perimetrical edge of the workpiece.

12 Claims, 9 Drawing Sheets

(51) Int. Cl.
    *B23Q 3/18*     (2006.01)
    *B25B 11/00*    (2006.01)
    *B25B 11/02*    (2006.01)
    *B25H 1/10*     (2006.01)
    *B25H 1/02*     (2006.01)
    *B64F 5/10*     (2017.01)

(52) U.S. Cl.
    CPC ............ *B25B 11/002* (2013.01); *B25B 11/02* (2013.01); *B25H 1/02* (2013.01); *B25H 1/10* (2013.01); *B64F 5/10* (2017.01)

(56) References Cited

U.S. PATENT DOCUMENTS

| | | | | |
|---|---|---|---|---|
| 2,866,889 A | * | 12/1958 | Dempsey | B23K 9/035 219/123 |
| 3,650,032 A | | 3/1972 | Kestler | |
| 4,516,308 A | * | 5/1985 | Urban | B23Q 39/00 228/45 |
| 5,010,622 A | * | 4/1991 | Morita | E05C 17/56 16/82 |
| 5,018,563 A | * | 5/1991 | Yoder | B25H 1/04 144/1.1 |
| 6,278,350 B1 | * | 8/2001 | Dorner | B23K 37/0408 269/8 |
| 6,644,637 B1 | * | 11/2003 | Agapiou | B25B 5/061 269/152 |
| 7,647,681 B1 | * | 1/2010 | Harris | B23K 37/0408 269/17 |
| 8,661,684 B1 | | 3/2014 | Boyd et al. | |
| 8,800,128 B2 | | 8/2014 | Masakawa et al. | |
| 2002/0140149 A1 | * | 10/2002 | Kimble | B25B 11/005 269/21 |
| 2004/0155393 A1 | * | 8/2004 | Wright | B25B 11/002 269/8 |
| 2011/0048288 A1 | * | 3/2011 | Sheldon | A22C 25/06 108/25 |
| 2013/0277902 A1 | * | 10/2013 | Lin | B25H 1/04 269/8 |
| 2014/0328655 A1 | | 11/2014 | Nou et al. | |

* cited by examiner

UNIVERSAL MAGNETIC TABLE JIG ASSEMBLIES AND METHODS FOR POSITIONING A WORKPIECE, ESPECIALLY FOR THE FABRICATION OF AIRCRAFT STRUCTURAL COMPONENTS

FIELD

The embodiments disclosed herein relate generally to the positioning of workpieces on a table jig, especially the positioning of workpieces relative to a robotically operated tool (e.g., a robotically operated drill), such as aircraft structural components.

BACKGROUND

In various branches of the manufacturing industry, during the several stages of production processes, there is a need to handle parts and assemblies until the formation of the final product. The transportation and handling of such parts (components) in each stage depends on the type of process, size of the components, as well as their physical characteristics, such as dimensions, geometry, weight, and fragility.

During the manufacture of relatively large-sized aircraft structural components, for example, it is necessary to periodically position the component at various stages of the fabrication process to allow for robotically operated tools to act on the component. For example, it may be necessary to position an airfoil structure in operative proximity to a robotically controlled drill to allow for the automated drilling of holes to thereby permit subsequent riveting. It is thus essential that the component be positioned accurately and immovably relative to the robotically operated tool so that the robotic controllers can issue repeatable commands necessary for the tasks to be reliably performed based on the particular component being fabricated.

Assemblies and methods for the handling, transporting and/or positioning aircraft component parts with the use of jig assemblies is known. In this regard, US Patent Application Publication 2014/0328655 (the entire content of which is expressly incorporated by reference herein) discloses a jig assembly for supporting an aircraft component part. The jig includes an elongate spar assembly, a plurality of rib assemblies attached to the spar, and a plurality of tensionable strap assemblies operatively associated with the rib assemblies for capturing and holding the component part against the rib assemblies. The strap assemblies may include a strap ratchet mechanism and a strap, so that operation of the strap ratchet mechanism allows strap slack to be removed thereby tensioning the strap. The jig assembly may be positioned and oriented by suspension cables and a hoist mechanism to allow it to be removably connected to a moveable transport dolly.

U.S. Pat. No. 8,661,684 (the entire content of which is expressly incorporated by reference herein) discloses a single piece pulsed flow wing assembly method to provide for the horizontal manufacture of aircraft wings using synchronized automated vehicles guided in a predetermined manner to move and locate wing structures in a plurality of assembly positions.

While the proposals in the art are satisfactory for their intended purposes, further improvements are desired. For example, it would be especially desirable if a jig could be provided which is capable of universally positioning a variety of different structural components relative to a robotically operated tool with minimal set-up time and/or required layout area. It is towards fulfilling such needs that the embodiments described herein are directed.

SUMMARY

Broadly, the embodiments disclosed herein are directed toward magnetic table jig assemblies and methods whereby workpieces on the table jig assembly may be accurately indexed relative to a robotically operated tool (e.g., a robotically operated drill). According to certain embodiments, a magnetic table jig assembly is provided for positioning a workpiece which includes a wheeled frame which is capable of rolling movement across a floor surface, a horizontally planar table top exhibiting ferromagnetic properties supported by the frame and a plurality of magnetic workpiece positioners each including an actuator to magnetically couple and decouple the magnetic workpiece positioner to the table top. The workpiece will therefore be positioning restrained on the table top by magnetically coupling the plurality of the magnetic workpiece positioners to the table top in abutting relationship to a perimetrical edge of the workpiece.

In order to establish the indexed position of the table jig assembly relative to a robotically operated tool, a fixed position floor anchor having ferromagnetic properties may be immovably attached to the floor surface. The position of the floor anchor will thereby define the indexed position of the table jig. The table jig assembly may thus be provided with a magnetic table positioner dependently attached to the frame, whereby the magnetic table positioner includes a selector for magnetically coupling and decoupling the table positioner to the fixed- position floor anchor. The table jig assembly is therefore capable of being immovably positioned when the table positioner is magnetically coupled to the floor anchor, but may be rolled across the floor surface when the table positioner is magnetically decoupled from the floor anchor. The floor anchor may include an upright plate having ferromagnetic properties to which the magnetic table positioner may be magnetically coupled and decoupled, and a base plate substantially perpendicular to the upright plate, the base plate being fixed to the floor surface.

Some embodiments of the table jig assembly will include a plurality of opposed pairs of levelling foot assemblies attached to the frame to allow for levelling of the table top relative to a target horizontal plane. The levelling foot assemblies according to some embodiments may be provided with a threaded shaft having an operator wheel at an upper end thereof and a foot pad at a lower end thereof for engagement with the floor surface, and a threaded collar assembly receiving the threaded shaft. The frame assembly may therefore be raised and lowered depending upon a direction of turning movement applied to the operator wheel to thereby allow levelling of the table top relative to a target horizontal plane. The levelness of the table top may be visually verified by providing opposed pairs of sight level assemblies attached to the frame and positioned at ends of the table assembly to provide a visual indication of table top levelness relative to the target horizontal surface.

In order to accommodate workpieces of different sizes and/or geometric shapes, the table jig assembly may be provided with a plurality of non-magnetic differently sized and/or shaped spacer blocks. Selected ones of the spacer blocks are thereby positionable in abutting contact between the perimetrical edge of the workpiece and a respective one of the magnetic table positioners. Proper positioning and alignment of the workpiece may also be aided by mutually perpendicular x-axis and y-axis grid lines formed on the table top to provide a mapped reference for placement of workpiece on the table top.

In use, the workpiece may be oriented relative to a robotically operated tool by immovably positioning the workpiece on the table top relative to x-axis and y-axis grid lines thereon, e.g., by magnetically coupling the plurality of magnetic workpiece positioners to the table top adjacent to a perimetrical edge portion of the workpiece, and moving the table jig into an indexed position relative to the robotically operated tool to allow for operative interaction with the workpiece on the table top. One or more non-magnetic spacers may be positioned between predetermined ones of the magnetic workpiece positioners and the perimetrical edge portion of the workpiece as may be required to accommodate workpieces of virtually any size and/or shape.

A fixed-position floor anchor may be immovably attached to the floor surface in proximity to the robotically operated tool to thereby define the indexed position of the table jig relative to the robotically operated tool. The table jig assembly may be provided with a magnetic table positioner which can be brought into abutting contact with the floor anchor by movement of the table jig assembly across the floor surface. The operation of a selector of the magnetic table positioner will thereby magnetically couple the magnetic table positioner to the floor anchor whereby the table jig is immovably located at the indexed position (e.g., by selective operation of opposed pairs of levelling feet assemblies operatively associated with the jig assembly frame and visually verifying whether or not the table to is level by means of sight levels).

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which.

DETAILED DESCRIPTION

Figure 1:
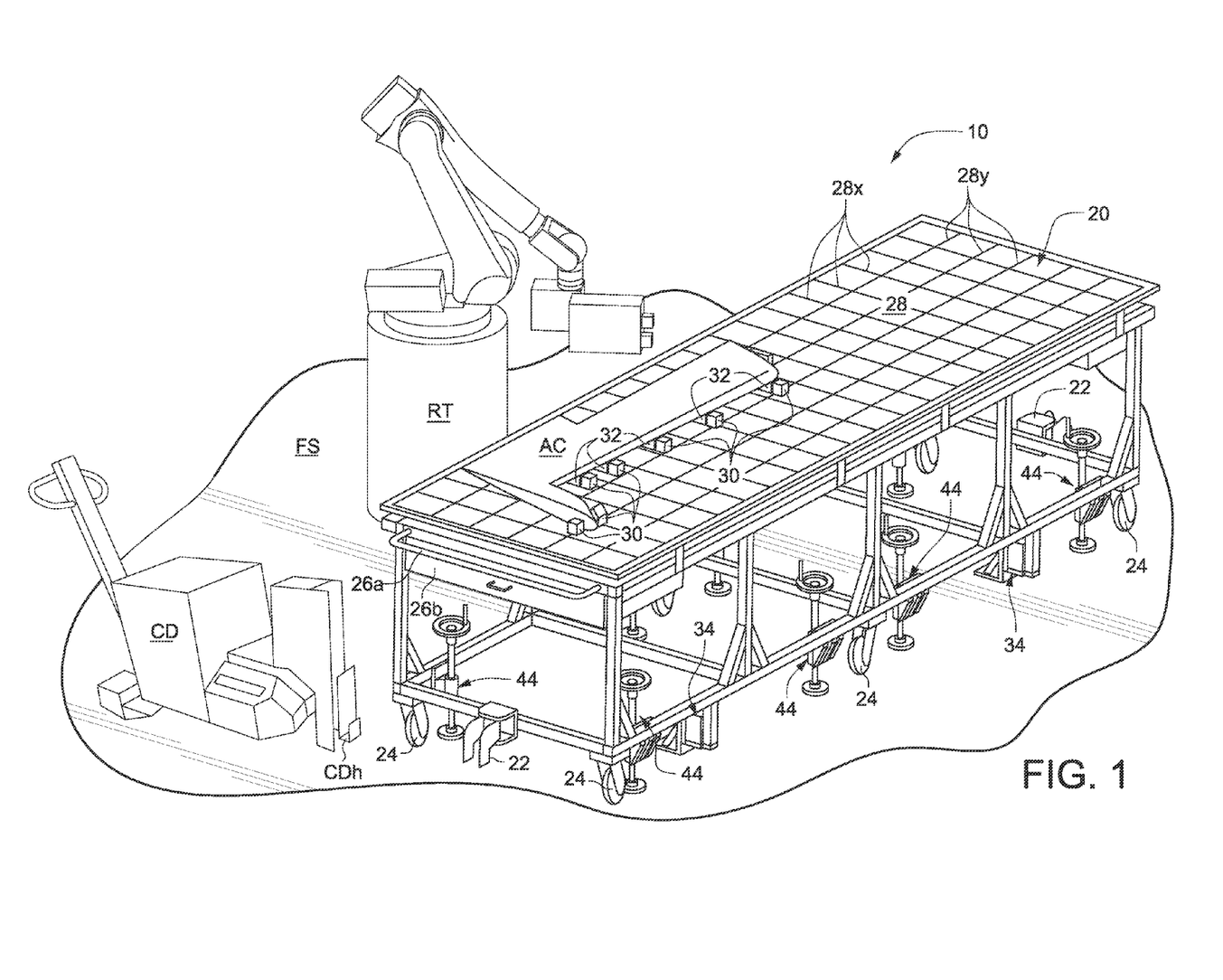
FIG. 1 is a perspective view of a universal magnetic table jig assembly in accordance with an embodiment of the invention.

Accompanying FIG. 1 depicts a magnetic table jig assembly 20 positionable relative to a robotically operated tool RT and a conveyance device CD. The robotically operated tool RT may be any type of computer-controlled robotic manipulator and/or assembler. In the environment depicted, the robotically operated tool RT functions to drill aligned holes in the fabrication of an aircraft component AC positioned as a workpiece on the magnetic table assembly 20.

The conveyance device CD may be any conventional manually or automatically operated industrial conveyer (e.g., battery-operated conveyer) to move the magnetic table jig assembly 20 between fabrication locations and their associated robotically operated tools RT in the assembly of the aircraft component AC. Thus, whereas one of the robotically operated tools RT at one fabrication location may drill aligned holes in the aircraft component AC, another robotically operated tool RT may serve to insert fasteners/rivets and/or weld components to one another. The conveyance device CD may include a conventional hitch coupler $CD_h$ which cooperates with a correspondingly configured hitch post 22 associated with the table jig assembly 20. The hitch coupler $CD_h$ may thus be removably coupled to the hitch post 22 so as to allow the table assembly 20 to be conveyed to a different location, e.g., another fabrication station. The table jig assembly 20 will thus be provided with suitable caster wheels 24 attached to the table frame 26 to allow rolling movement along supporting surface of the facility floor FS. The frame 26 may be provided with a grab rail 26a at its ends to permit manual movement and/or positioning of the table assembly 20.

Figure 2:
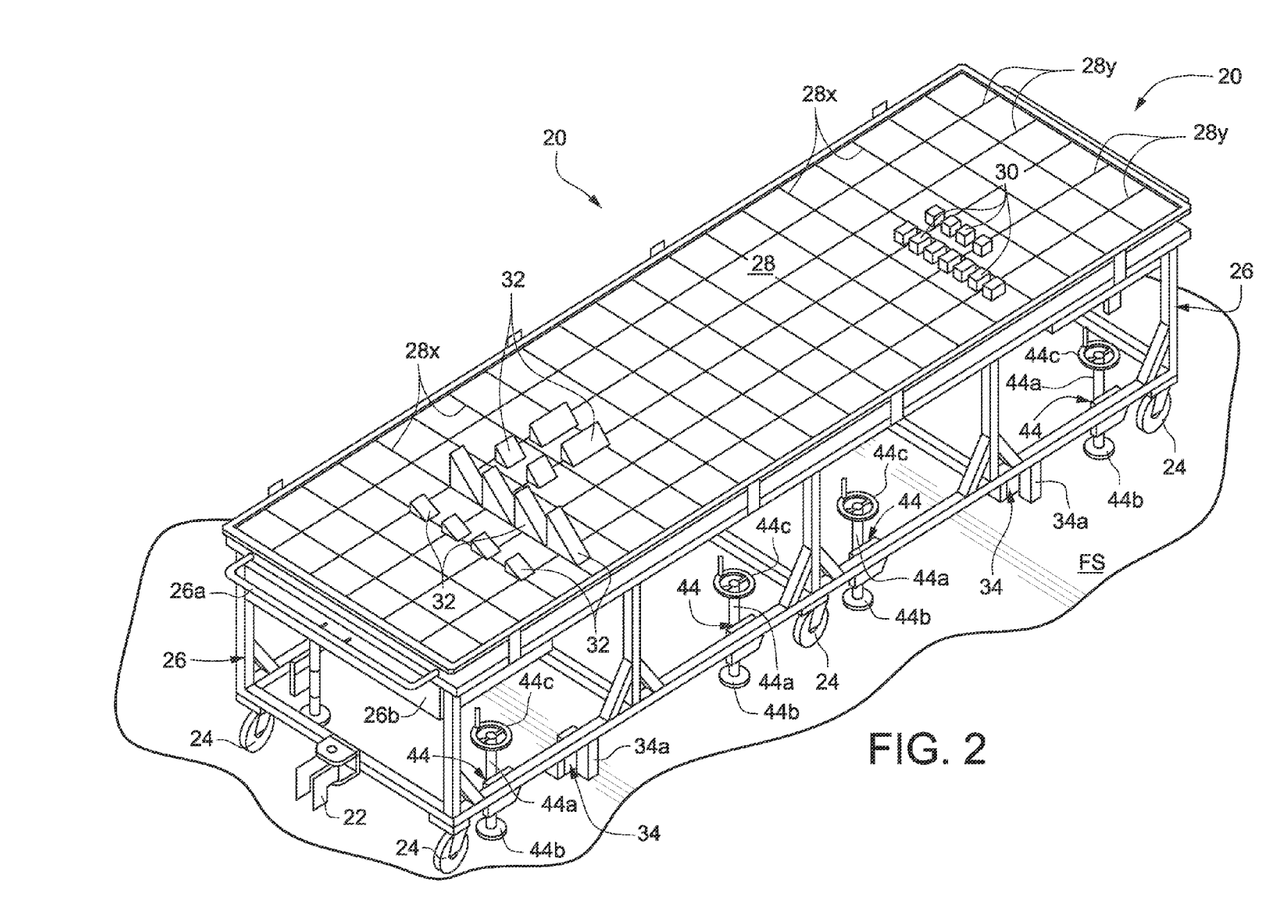
FIG. 2 is a further perspective view of the universal magnetic table jig assembly with various magnetic positioners and non-magnetic holders that may be employed to universally position a variety of differently sized and/or shaped components on the table top as workpieces.
Figure 3:
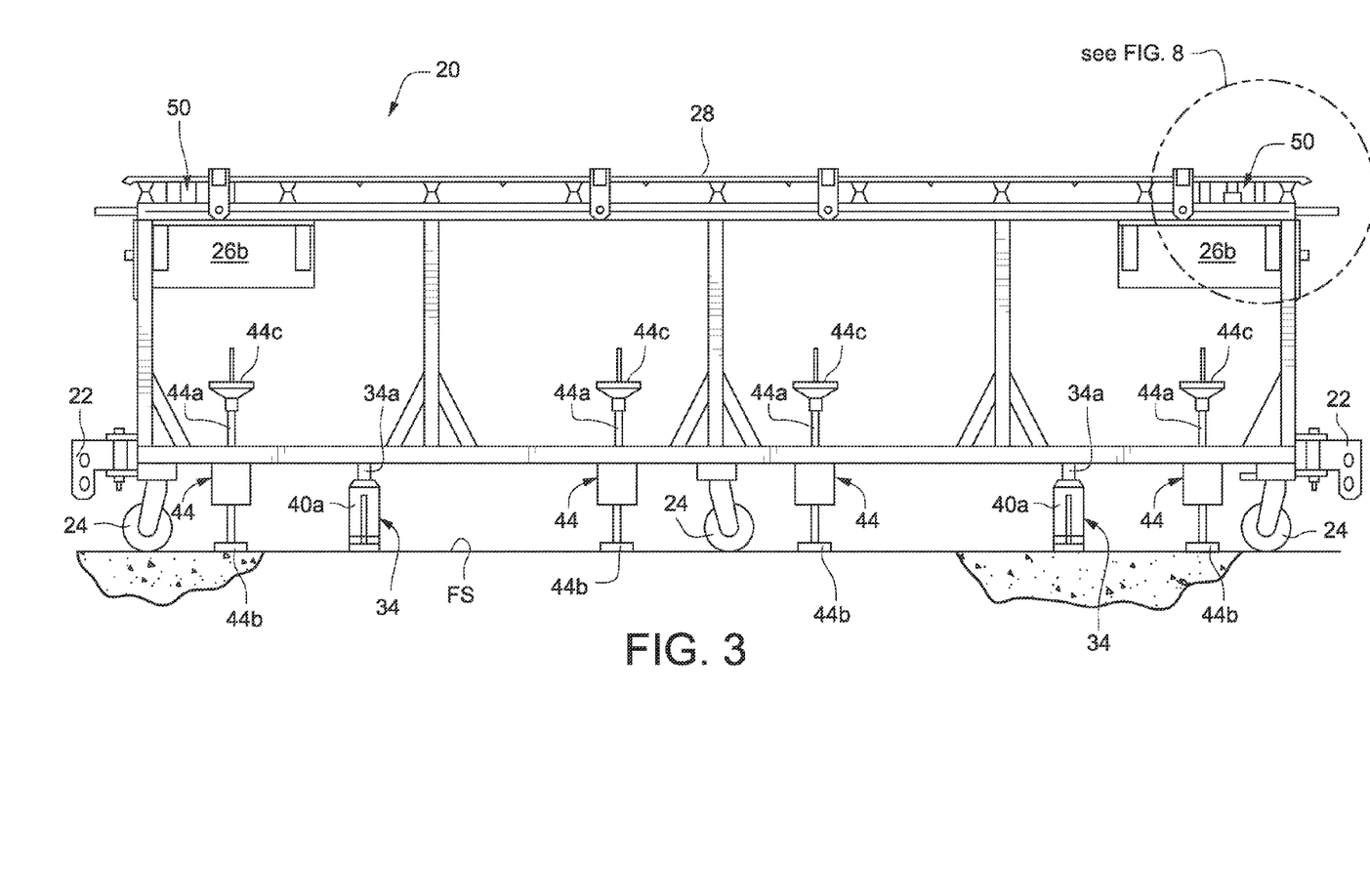
FIG. 3 is a side elevational view of the table jig assembly depicted in FIG. 2.
Figure 4:
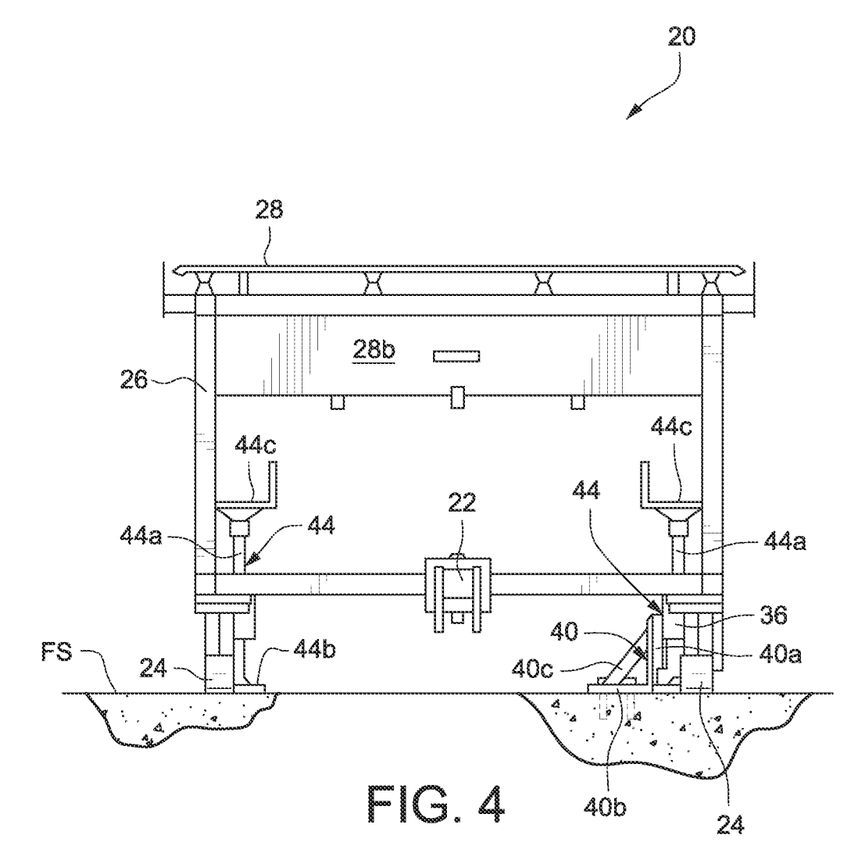
FIG. 4 is an end elevational view of the table jig assembly depicted in FIG. 2.
Figure 5:
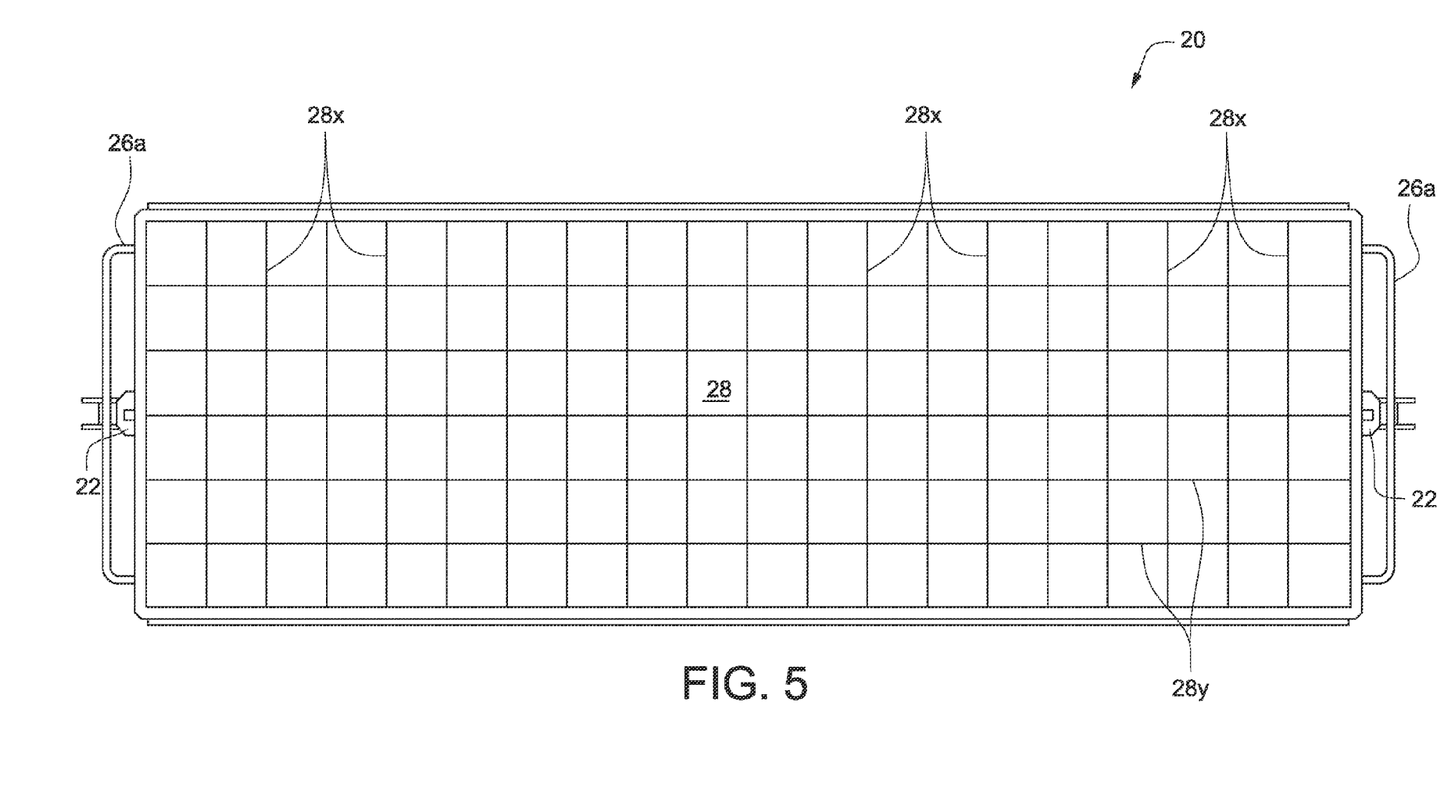
FIG. 5 is a top plan view of the table jig assembly depicted in FIG. 2.

As is perhaps more clearly depicted in FIGS. 2-5, the magnetic table jig assembly 20 includes the table frame 26 which supports an upper horizontally planar table top 28. The table top 28 is most preferably comprised of or made from a sheet of ferromagnetic material (e.g., steel) to thereby allow the magnetic workpiece positioners (a few of which are depicted in FIG. 2 by reference numeral 30) containing permanent magnets to be magnetically coupled thereto. The table top 28 defines visible grid lines (a few of which are identified in FIG. 2 by reference numerals 28x and 28y) along the x and y axes thereof, respectively.

Although not shown in the drawings, additional indicia may be provided on the table top 28 so as to uniquely identify each location defined by the mutual intersection of the x-axis and y-axis grid lines 28x, 28y, respectively, to thereby facilitate the pre-planned position of the aircraft component AC on to the table top 28. The assembly 20 may also be provided with non-magnetic spacers (a few of which are identified in FIG. 2 by reference numerals 32) of various geometric size and shape to be used in combination with the magnetic workpiece positioners 30 as will be discussed in greater detail below. The magnetic workpiece positioners 30 and the non-magnetic spacers 32 may be kept in close proximity to the table 28 within the end storage drawers 28a.

The frame 26 supports dependent magnetic frame positioner assemblies 34 for immovably but releasably positioning the table jig 20 relative to the robotically operated tool RT. As is perhaps more clearly depicted in the enlarged view of FIG. 6, the magnetic table positioner assemblies 34 include a post 34a rigidly affixed at its upper end to the table frame 26 and carrying a support platform 34b rigidly affixed to its lower end. The support platform 34b carries a magnetic table positioner 36 which is capable of being magnetically coupled and uncoupled to a fixed-position floor anchor 40. The floor anchors 40 provide fixed index references for the table top 28 that may be used by the controller for the robotically operated tool RT.

Figure 6:
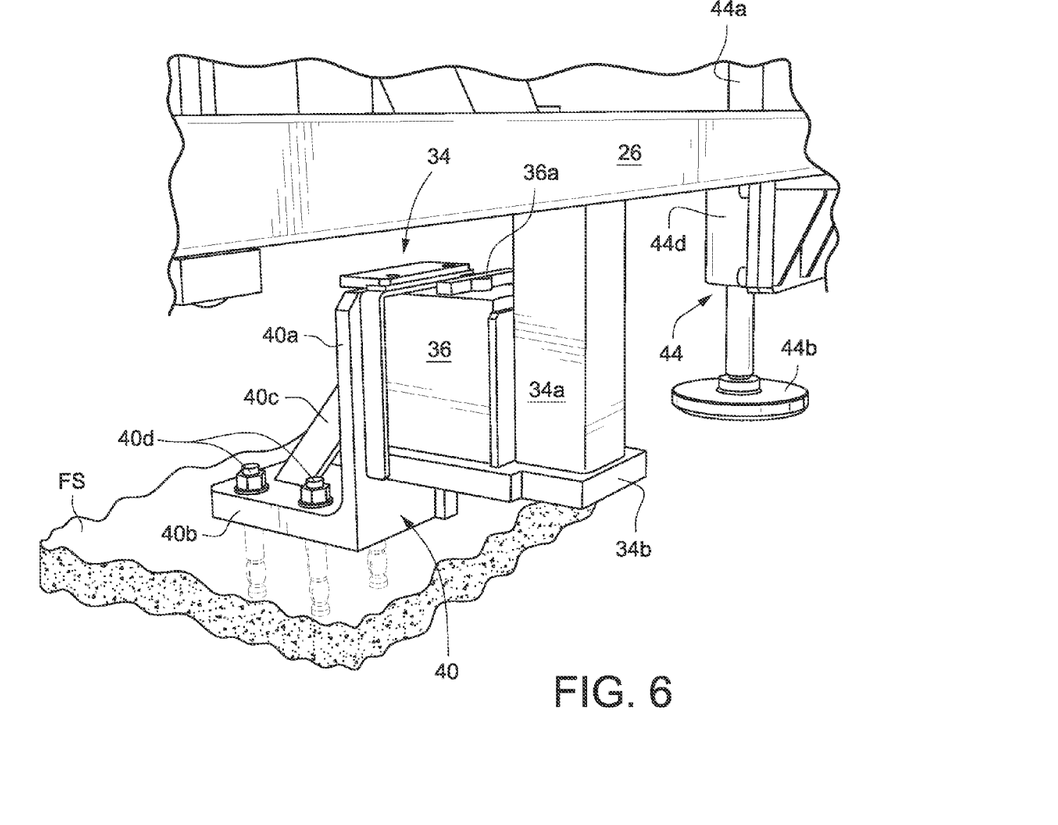
FIG. 6 is an enlarged perspective detail view of a representative magnetic table positioning assembly for immovably but releasably positioning the table jig assembly relative to a robotically operated tool.

The floor anchor 40 may be in the form of an L-shaped structure as shown having a vertically upright plate 40a and a base plate 40b formed at a right angle thereto. An angle brace 40c extends between and rigidly braces the upright plate 40a to the base plate 40b. The base plate is immovably fixed to the facility floor FS by means of suitable bolts 40d. At least the upright plate 40a of the anchor 40, and typically the entirety of the anchor 40, is formed of a ferromagnetic material (e.g., steel).

The magnetic table positioner 36 is in and of itself conventional in that an internal permanent magnet is provided that may be turned (rotated) by the selector 36a so as to bring the permanent magnet into and out of magnetic coupling with the upright plate 40a. Thus, when the selector 36a is turned so as to magnetically couple the positioner 36 to the upright plate 40a, the table assembly 20 will be immovably locked at a predefined position relative to the robotically operated tool RT. In such a manner therefore, the x-axis and y-axis grid lines 28x and 28y will thus in turn be in a predefined position relative to the robotically operated tool RT.

Figure 7:
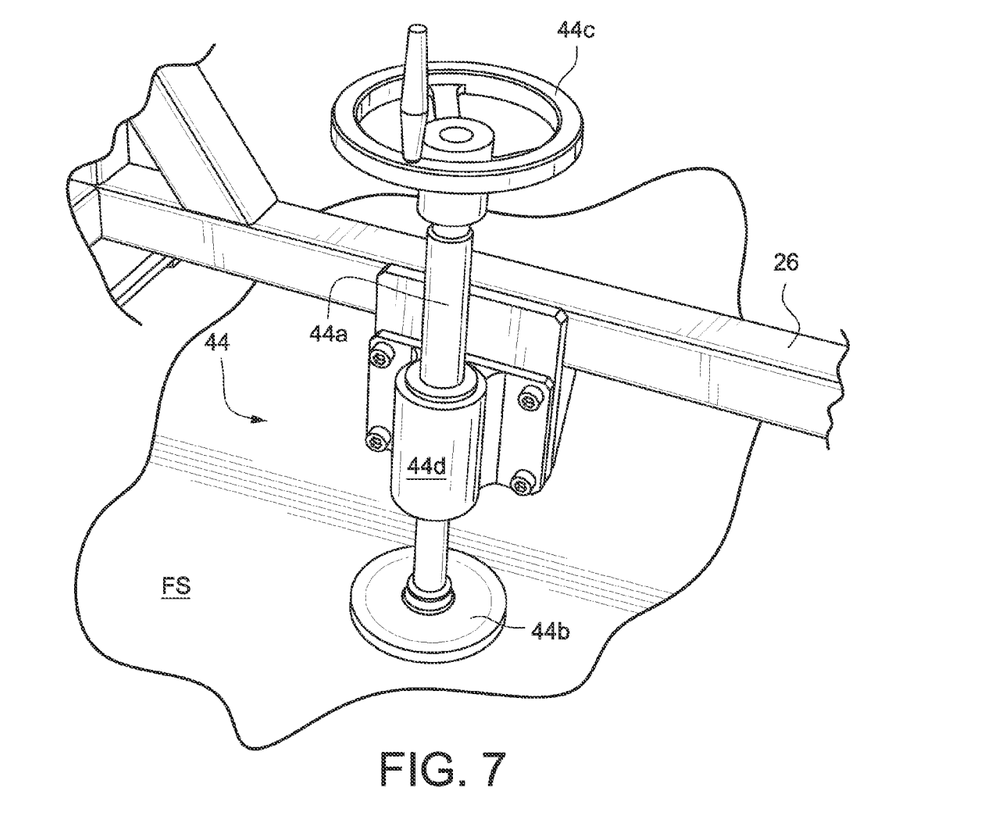
FIG. 7 is an enlarged detailed perspective view of a representative levelling foot assembly for leveling the table jig assembly.

In order to ensure proper leveling of the table top 28, the frame 26 also carries opposed pairs of levelling foot assemblies 44. A representative levelling foot assembly is depicted in greater detail by FIG. 7. As shown, the levelling foot assembly 44 includes a threaded shaft 44a which is vertically supported by a threaded collar assembly 46 attached to the frame 26. The lower end of the shaft 44a is provided with a planar foot pad 44b while the upper end of the shaft 44a is connected to an operator wheel 44c. Manual turning movement applied to the operator wheel 44c will therefore be translated into lowering or raising of the foot pad 44b relative to the frame assembly 26 (i.e., dependent upon whether the shaft 44a is turned by the operator wheel 44c in either a clockwise or counterclockwise direction, respectively). When in contact with the facility floor FS, therefore, turning the operator wheel 44c in either a clockwise or counterclockwise direction will respectively translate into slight (but meaningful) adjustments being made to the table top 28 by virtue of the frame 26 being slightly (but meaningfully) raised and lowered.

Figure 8:
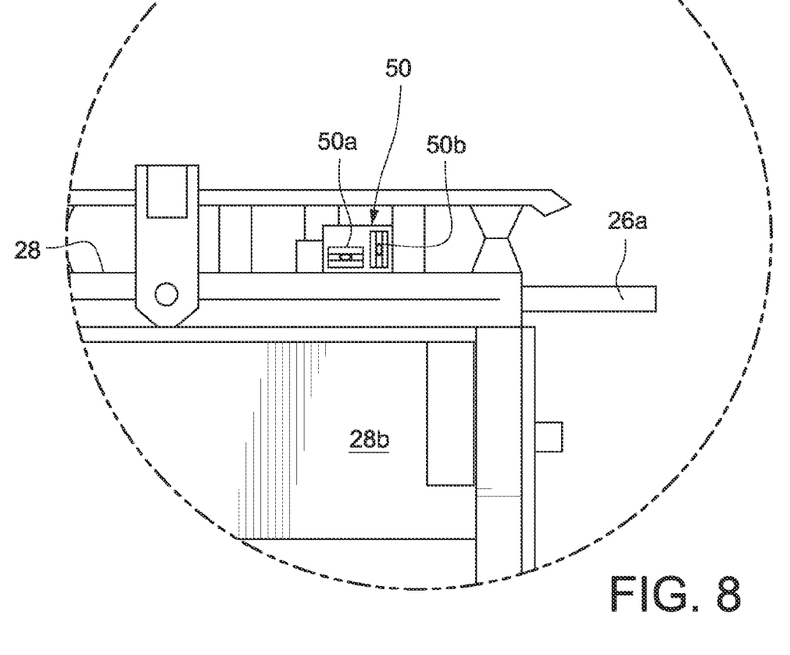
FIG. 8 is an enlarged detailed side elevational view of the sight levels employed to ensure that the table top of the table jig assembly is level relative to a target horizontal plane.

Opposed pairs of sight level assemblies 50 are positioned near each end of the table assembly 20 so as to allow for a visual indication of the table levelness relative to a target horizontal plane that is obtained by coordinated manipulation of the levelling foot assemblies 40 in the manner described above. The sight level assemblies 50 include conventional sight bubble indicators 50a, 50b oriented parallel and perpendicular to the target horizontal plane. When each of the sight bubbles of each of the sight level assemblies 50 is positioned at its centered location, the operator will then know that the table 28 is itself positioned so as to be level with respect to the target horizontal plane.

In use, table assembly 20 is manipulated into position so as to bring the magnetic table positioners 36 into adjacent face-to-face contact with the vertical plates 40a of the floor anchors 40. The table top 28 may be levelled by the coordinated manipulation of the levelling foot assemblies 44, the levelness of the table top 28 being assured by the visual indication provided by means of the sight level assemblies 50. With the table top 28 level, the selector 36a of the magnetic positioners 36 may be operated so as to cause the magnetic positioner to be magnetically coupled to the upright plate 40a of the floor anchor 40. Once the table assembly 20 has been magnetically coupled to the floor anchors 40, the table assembly 20, and hence the table top 28, will be properly indexed relative to the robotically operated tool RT. As such, the programmatic controller for the tool RT will then be capable of using the floor anchors 40 as fixed indexes for the table top 28.

The aircraft component AC may be placed onto the table top 28 in a pre-planned location either before or after the positioning of the table assembly 20 relative to the robotically operated tool RT. In either situation, the x-axis and y-axis grid lines provide a map reference for the proper positioning of the aircraft component AC onto the table top 28 in its pre-planned position.

Figure 9:
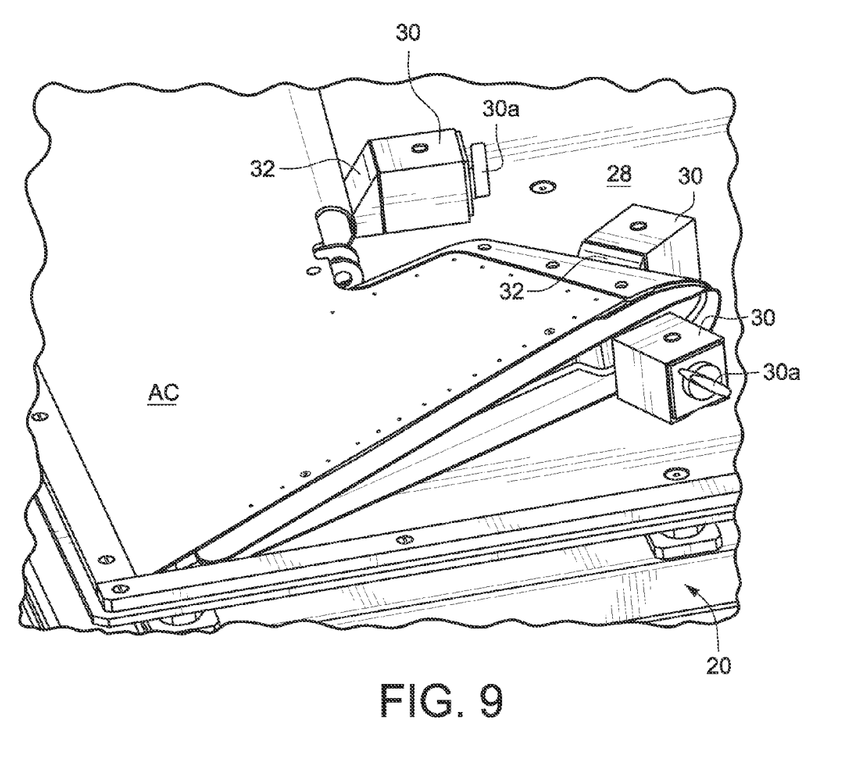
FIG. 9 is an enlarged perspective detail view showing representative magnetic workpiece positioners and non-magnetic spacers in use for positioning an aircraft structural component as a workpiece on the table top of the table jig assembly.

Once the aircraft component AC has been placed onto the table top 28 in its pre-planned location, the magnetic workpiece positioners 30 and/or the non-magnetic spacers 32 may be placed into abutting contact at perimetrical edge regions of the aircraft component AC. As is perhaps better shown by FIG. 9, the spacers 32 allow for a transition between, e.g., a leading edge of the aircraft component AC and an individual one of the magnetic workpiece positioners 30 thereby protecting the leading edge of the aircraft component AC from damage. Once the desired number of magnetic workpiece positioners 30 and/or non-magnetic spacers 32 have been placed onto the table top 28 in abutting contact with the perimetrical edge regions of the aircraft component AC, the actuators 30a of each positioner 30 may be turned so as to cause the associated positioner 30 to be magnetically coupled to the table top 28. In this regard, like the table positioner 36 described previously in relation to FIG. 6, each of the associated workpiece positioners 30 is in and of itself conventional in that it contains a permanent magnet (not shown) that may be rotated within the positioner 30 by means of the actuator 30a so as to cause the permanent magnet to be magnetically coupled and decoupled relative to the table top 28.

With all of the workpiece positioners 30 actuated so as to be magnetically coupled to the table top 28, the robotically operated tool RT may then be activated so it performs the desired automated tool operations. When the robotically operated tool RT is finished, the table assembly may be magnetically uncoupled from the floor anchors 40 (i.e. by movement of the selector 36a as described previously) so that the conveyance device may be connected to the hitch post 22 to allow the table assembly 20 (and the aircraft component AC thereon) to be transported to another downstream processing location. When all manufacturing processes have been completed, the aircraft component AC may be removed from the table top 28 by movement of the actuators 30a so as to magnetically uncouple the positioners 30 from the table top 28. The positioners 30 and spacers 32 may then be stored within the drawers 28a until next required for another similar to different aircraft component AC.

The invention herein is not to be limited to the disclosed embodiments, but on the contrary, is intended to cover various modifications and equivalent arrangements included within the spirit and scope of the appended claims.

What is claimed is:

1. A method of orienting a workpiece relative to a robotically operated tool, the method comprising:
   (a) providing a table jig assembly comprised of:
      (a1) a wheeled frame which is capable of rolling movement across a floor surface;
      (a2) a horizontally planar table top exhibiting ferromagnetic properties supported by the frame;
      (a3) a plurality of magnetic workpiece positioners each including an actuator to magnetically couple and decouple the magnetic workpiece positioner to the table top; and
      (a4) a magnetic table positioner;
   (b) immovably positioning the workpiece on the table top relative to x-axis and y-axis grid lines thereon by magnetically coupling the plurality of magnetic workpiece positioners to the table top adjacent to a perimetrical edge portion of the workpiece; and
   (c) moving the table jig assembly into an indexed position relative to a robotically operated tool to allow for operative interaction between the robotically operated tool and the workpiece on the table top by:
      (c1) positioning the table jig assembly such that the magnetic table positioner is in abutting contact with a fixed-position floor anchor which defines the indexed position relative to the robotically operated tool; and
      (c2) operating a selector of the magnetic table positioner to magnetically couple the magnetic table positioner to the floor anchor whereby the table jig is immovably located at the indexed position.

2. The method according to claim 1, wherein step (b) comprises positioning a non-magnetic spacer between at least one of the magnetic workpiece positioners and the perimetrical edge portion of the workpiece.

3. The method according to claim 1, wherein step (b) is practiced before step (c).

4. The method according to claim 1, wherein step (c) is practiced before step (b).

5. The method according to claim 1, wherein step (c) further comprises levelling the table top of the table jig assembly relative to a target horizontal plane.

6. The method according to claim 5, wherein the step of levelling the table top of the table jig assembly is practiced before step (c2).

7. The method according to claim 1, wherein step (c) comprises levelling the table top of the table jig assembly relative to a target horizontal plane.

8. The method according to claim 7, wherein step (c) is practiced by magnetically coupling the table jig assembly to a fixed-position floor anchor which defines the indexed position.

9. The method according to claim 1, wherein step (c) is practiced by magnetically coupling the table jig assembly to a fixed-position floor anchor which defines the indexed position.

10. The method according to claim 1, further comprising leveling the table top relative to a target horizontal plane by operating a plurality of opposed pairs of levelling foot assemblies attached to the frame of the table jig assembly.

11. The method as in claim 10, wherein leveling of the table top is practiced by applying turning movement in a selected turning direction to an operator wheel of a threaded shaft having at a lower end thereof a foot pad engaged with the floor surface so as to raise or lower the wheeled frame of the jig assembly depending upon the selected turning direction applied to the operator wheel.

12. The method as in claim 1, wherein step (c) comprises connecting a hitch post at an end of the frame to a conveyance device, and operating the conveyance device when connected to the hitch post to provide motive transport of the table jig assembly across the floor surface.

* * * * *

UNITED STATES PATENT AND TRADEMARK OFFICE
CERTIFICATE OF CORRECTION

| | | |
|---|---|---|
| PATENT NO. | : 9,737,967 B2 | |
| APPLICATION NO. | : 14/573197 | |
| DATED | : August 22, 2017 | |
| INVENTOR(S) | : Reckevícius et al. | |

It is certified that error appears in the above-identified patent and that said Letters Patent is hereby corrected as shown below:

On the Title Page

Column 1 (72) Inventors:
Paulo Reiss, Jr., should read Paulo Reiss, Junior

Signed and Sealed this
Sixth Day of February, 2018

Joseph Matal
*Performing the Functions and Duties of the*
*Under Secretary of Commerce for Intellectual Property and*
*Director of the United States Patent and Trademark Office*